No. 747,164. PATENTED DEC. 15, 1903.
J. M. GREIST.
SEWING MACHINE PRESSER FOOT HOLDER.
APPLICATION FILED APR. 14, 1903.
NO MODEL.
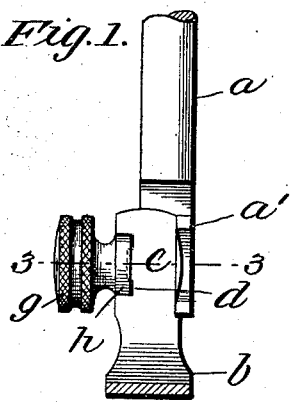
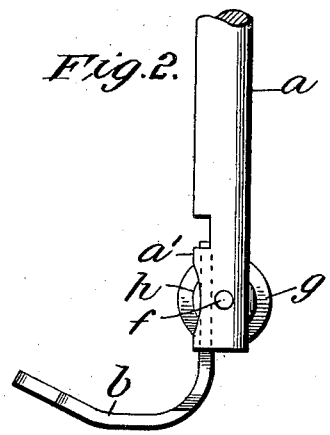
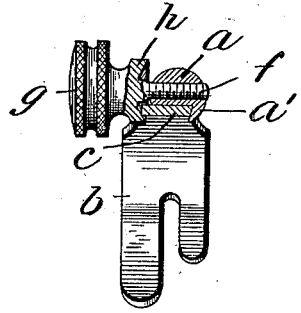
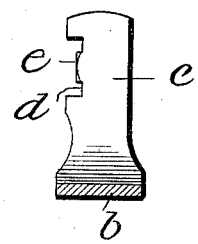
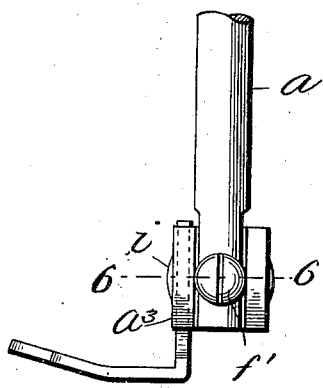
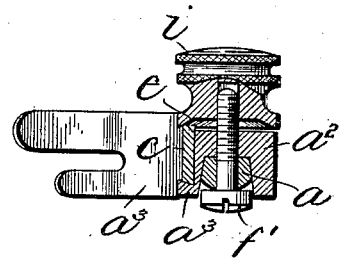
WITNESSES:
Wm. A. Doyle
C. M. Sweeney
INVENTOR:
John M. Greist
BY Henry Calver
Attorney.

No. 747,164. Patented December 15, 1903.

UNITED STATES PATENT OFFICE.

JOHN M. GREIST, OF NEW HAVEN, CONNECTICUT.

SEWING-MACHINE PRESSER-FOOT HOLDER.

SPECIFICATION forming part of Letters Patent No. 747,164, dated December 15, 1903.

Application filed April 14, 1903. Serial No. 152,605. (No model.)

*To all whom it may concern:*

Be it known that I, JOHN M. GREIST, a citizen of the United States, residing at New Haven, in the county of New Haven and State of Connecticut, have invented certain new and useful Improvements in Sewing-Machine Presser-Foot Holders, of which the following is a specification, reference being had therein to the accompanying drawings.

This invention has for its object to provide a simple device whereby a sewing-machine presser-foot may be conveniently and quickly placed in or removed from working position on a sewing-machine, whether the said foot be an ordinary presser-foot or whether it be an attachment presser-foot such as is used in connection with hammers, binders, rufflers, tuck-markers, and the like.

To this end the improved presser-foot-holding device comprises an undercut rib or flange which may be integral with the presser-bar or with a block attached thereto and against which one side of the shank of the presser-foot is to impinge, said shank having at its opposite side a notch, the upper and lower walls of which will embrace the flange of a clamping screw or nut and the bottom of which notch is provided with a slightly-raised lug or bearing portion, against which an end shoulder of the clamping-screw will impinge for the holding or clamping operation. The bearing or end shoulder of the clamping screw or nut, which impinges against the said lug at the bottom of the notch in the side of the shank of the presser-foot, is preferably slightly inwardly beveled or undercut, so that the said lug or projection can extend into the same in such a manner that as the nut or screw is tightened the cupped or undercut shoulder at the bearing end of the head thereof will tend to draw the shank of the presser-foot tightly against a flat bearing portion on the presser-bar or on a block attached to the said bar, as the case may be. The undercut vertical flange on the presser-bar or on the block attached thereto will preferably be formed on the front side of the presser bar or block, so that the presser-foot will be placed into or removed from working position from the front of the presser-bar, and the clamping nut or screw will be correspondingly arranged, so as to be movable laterally in its clamping or unclamping action.

In the accompanying drawings, Figure 1 is a front and partly-sectional view of a presser-bar and presser-foot embodying one form of the invention, and Fig. 2 is a side view of the same. Fig. 3 is a horizontal section of the same on line 3 3, Fig. 1. Fig. 4 is a detail front view of the presser-foot shank. Fig. 5 is a side view of a slightly-modified form of the invention, and Fig. 6 is a horizontal section of the same on line 6 6, Fig. 5.

Referring to the drawings, $a$ denotes a round presser-bar cut away at its lower front portion to form a flattened face, at one side of which is left a vertical undercut rib or flange $a'$ as an integral portion of the said presser-bar, and $b$ denotes the presser-foot, the shank portion $c$ of which is preferably provided at one side with a notch $d$, at the bottom of which is a small raised portion or lug $e$. The presser-bar is provided with a transverse hole, in which fits a screw $f$, provided with a milled head $g$ and with a flange $h$, the latter being of a size to be embraced or straddled by the upper and lower walls of the said notch $d$ in the side of the shank of the presser-foot, and when the said screw is tightened the shank $c$ of the presser-foot will be clamped between the shoulder at the inner end of the flange $h$ and the vertical rib or flange $a'$, said shoulder being slightly undercut or cupped and being large enough in diameter to enable its outer peripheral portion to slightly overlap the said lug or bearing portion $e$ at the bottom of the notch in the presser-foot, so that as the screw is tightened the pressure of the said bearing-shoulder at the inner end of the flange $h$ against said lug or raised portion $e$ will tend to draw the shank of the presser-foot firmly against the flattened bearing portion of the presser-bar as the opposite side of said shank is forced into holding contact with the said undercut rib or flange $a'$ on the presser-bar.

By means of the construction above described a sewing-machine presser-foot or presser-foot attachment may be readily secured in or removed from working position on the presser-bar of the machine simply by tightening or loosening a clamping screw or nut, and as the shank of the presser-foot is arranged to impinge against a flattened bearing portion at the front of the presser-bar the presser-foot or presser-foot attachment may be readily and conveniently adjusted to or removed from working position.

Instead of forming the vertical undercut rib or flange directly on the presser-bar, as in the preferred form of the invention, a similar rib or flange $a^3$ may be formed on a block $a^2$, rigidly attached to the presser-bar $a$ by the screw $f'$, and on the end of which screw, extended through the presser-bar, is fitted a clamping-nut $i$, constructed and operating in a manner similar to the clamping-screw above described in that said clamping-nut has at its inner end an undercut shoulder impinging against a raised lug or bearing portion $e$ at the bottom of a notch formed at one side of the shank of the presser-foot, so as to clamp said shank against the front face of the block $a^2$ and between said undercut shoulder and the undercut flange $a^3$, formed on the block $a^2$.

Having thus described my invention, I claim and desire to secure by Letters Patent—

1. A presser-foot-holding device consisting of a vertical undercut flange rigid with the presser-bar, combined with a presser-foot shank having at one side a slightly-raised lug or bearing portion, and a screw or nut having at its inner end a cupped or undercut shoulder the periphery of which overlaps the said lug or bearing portion on the said presser-foot shank.

2. A presser-foot-holding device consisting of the combination with a presser-bar provided with an integral, vertical, undercut lug or flange, of a presser-foot shank having at one side a slightly-raised lug or bearing portion, and a set-screw having at its inner end an undercut or cupped shoulder the periphery of which overlaps said lug or bearing portion on the said presser-foot shank.

3. A presser-foot-holding device consisting of the combination with a presser-bar and a vertical undercut rib or flange rigid therewith, of a presser-foot shank having at one side a notch or recess the bottom of which is provided with a slightly-raised lug or bearing portion, and a screw or nut having at its inner end a cupped or undercut shoulder the periphery of which overlaps said lug or bearing portion of said presser-foot shank, and said screw or nut having, adjacent to said shoulder, a flange or portion embraced or straddled by the upper and lower walls of said notch.

In testimony whereof I affix my signature in presence of two witnesses.

JOHN M. GREIST.

Witnesses:
P. R. GREIST,
W. C. GREIST.